United States Patent
Line et al.

(10) Patent No.: US 10,457,171 B2
(45) Date of Patent: Oct. 29, 2019

(54) FLEXIBLE MOTOR VEHICLE WORK SURFACE FOR LAPTOPS AND TABLETS

(71) Applicant: FORD GLOBAL TECHNOLOGIES, LLC, Dearborn, MI (US)

(72) Inventors: Johnathan Andrew Line, Northville, MI (US); Marcos Silva Kondrad, Macomb Township, MI (US); Kevin Wayne Preuss, Berkley, MI (US); Alan George Dry, Grosse Pointe Woods, MI (US); Amaury Diaz Serrano, Lathrup Village, MI (US); Daniel Ferretti, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/661,047

(22) Filed: Jul. 27, 2017

(65) Prior Publication Data
US 2019/0031055 A1    Jan. 31, 2019

(51) Int. Cl.
| B60N 2/32 | (2006.01) |
| B60N 3/00 | (2006.01) |
| B60N 2/20 | (2006.01) |
| B60R 7/04 | (2006.01) |
| B60R 11/02 | (2006.01) |
| B60N 2/01 | (2006.01) |
| B60R 11/00 | (2006.01) |

(52) U.S. Cl.
CPC .............. *B60N 2/32* (2013.01); *B60N 2/01* (2013.01); *B60N 2/206* (2013.01); *B60N 3/002* (2013.01); *B60R 7/043* (2013.01); *B60R 11/0252* (2013.01); *B60R 2011/0007* (2013.01); *B60R 2011/0012* (2013.01)

(58) Field of Classification Search
CPC .......... B60N 2/10; B60N 2/206; B60N 3/001; B60N 3/002; B60N 3/004; B60N 2/32; B60R 7/043; B60R 2011/0007; B60R 2011/0015; B60R 11/0252
USPC ................ 296/24.34, 37.15, 64, 69; 224/275
See application file for complete search history.

(56) References Cited

U.S. PATENT DOCUMENTS

| 2,797,739 A | 7/1957 | Orsini |
| 2,913,295 A | 11/1959 | Park |

(Continued)

FOREIGN PATENT DOCUMENTS

| DE | 19901072 | 3/2000 |
| DE | 102005023602 | 5/2005 |

(Continued)

OTHER PUBLICATIONS

Computer translation of FR 2969066 (Year: 2019).*

*Primary Examiner* — Gregory A Blankenship
(74) *Attorney, Agent, or Firm* — Vichit Chea; Price Heneveld LLP

(57) ABSTRACT

A flexible motor vehicle work surface is operably coupled with a motor vehicle seating assembly and includes a deployable support structure operably coupled with the motor vehicle seating assembly, the deployable support structure comprising a base disposed on an upper surface thereof. A foldable wing is operably coupled with the deployable support structure, the foldable wing having a first stored position and a deployed second position forming a movable horizontal surface.

17 Claims, 17 Drawing Sheets

(56) References Cited

U.S. PATENT DOCUMENTS

| | | | | |
|---|---|---|---|---|
| 3,338,629 | A * | 8/1967 | Drees | B60N 3/002 224/275 |
| 3,451,261 | A | 3/1969 | Olsen | |
| 4,417,715 | A | 11/1983 | Edwards | |
| 4,809,897 | A | 3/1989 | Wright, Jr. | |
| 4,909,159 | A * | 3/1990 | Gonsoulin | A47B 23/04 108/143 |
| 4,928,865 | A * | 5/1990 | Lorence | B60N 3/102 224/275 |
| 4,955,571 | A | 9/1990 | Lorence et al. | |
| 5,046,433 | A | 9/1991 | Kramer | |
| 5,092,507 | A | 3/1992 | Szablak et al. | |
| 5,427,447 | A | 6/1995 | Satoh | |
| 5,511,842 | A | 4/1996 | Dilon | |
| 5,732,994 | A | 3/1998 | Stancu et al. | |
| 5,845,965 | A | 12/1998 | Heath et al. | |
| 6,015,198 | A | 1/2000 | Stair | |
| 6,032,587 | A * | 3/2000 | Salenbauch | B60N 3/002 108/44 |
| 6,123,377 | A | 6/2000 | Lecher | |
| 6,090,148 | A | 7/2000 | Weber | |
| 6,096,086 | A | 8/2000 | Weber | |
| 6,110,216 | A | 8/2000 | Weber | |
| 6,135,549 | A * | 10/2000 | Demick | B60N 3/001 108/44 |
| 6,167,580 | B1 | 1/2001 | Draheim et al. | |
| 6,220,660 | B1 * | 4/2001 | Bedro | B60N 2/79 297/188.04 |
| 6,347,590 | B1 | 2/2002 | D'Annunzio et al. | |
| 6,419,314 | B1 | 7/2002 | Scheerhorn | |
| 6,508,508 | B1 | 1/2003 | Bargiel | |
| 6,547,323 | B1 | 4/2003 | Aitken et al. | |
| 6,719,343 | B2 * | 4/2004 | Emerling | B60N 3/101 296/24.34 |
| 6,719,367 | B2 | 4/2004 | Mic et al. | |
| 6,746,065 | B1 | 6/2004 | Chan | |
| 6,761,388 | B2 | 7/2004 | Lein et al. | |
| 6,848,817 | B2 | 2/2005 | Bos | |
| 7,080,865 | B2 | 7/2006 | Bergeron | |
| 7,114,755 | B1 * | 10/2006 | Sturt | B60N 3/102 296/24.34 |
| 7,192,070 | B2 * | 3/2007 | Radu | B60R 7/04 296/24.34 |
| 7,278,681 | B2 | 10/2007 | Lilov et al. | |
| 7,293,507 | B2 | 11/2007 | DePue et al. | |
| 7,296,839 | B2 | 11/2007 | Scheerhorn | |
| 7,431,365 | B2 | 10/2008 | Sturt et al. | |
| 7,455,016 | B2 | 11/2008 | Perin | |
| 7,490,896 | B2 | 2/2009 | Smith | |
| 7,520,552 | B2 | 4/2009 | Nakamura et al. | |
| 7,523,985 | B2 | 4/2009 | Bhatia et al. | |
| 7,607,726 | B2 | 10/2009 | Orio et al. | |
| 7,641,252 | B2 | 1/2010 | Sturt et al. | |
| 7,748,762 | B2 | 7/2010 | Mayne, Jr. | |
| 7,770,953 | B2 | 8/2010 | Korai | |
| 7,793,597 | B2 | 9/2010 | Bart et al. | |
| 7,798,072 | B2 | 9/2010 | Beckler et al. | |
| 7,891,622 | B1 | 2/2011 | O'Keene | |
| 7,891,630 | B2 * | 2/2011 | Lipman | B60R 11/02 108/44 |
| 8,002,323 | B2 | 8/2011 | Jones et al. | |
| 8,109,565 | B2 | 2/2012 | Waters et al. | |
| 8,167,366 | B2 | 5/2012 | Charpentier et al. | |
| 8,397,963 | B2 | 3/2013 | Singh | |
| 8,421,407 | B2 | 4/2013 | Johnson | |
| 8,496,295 | B2 | 7/2013 | Chen | |
| 8,845,965 | B2 | 9/2014 | Carter et al. | |
| 9,168,850 | B2 | 10/2015 | Meszaros et al. | |
| 9,174,799 | B2 | 11/2015 | Virgen | |
| 10,232,747 | B2 * | 3/2019 | Line | B60N 2/3011 |
| 2003/0155787 | A1 * | 8/2003 | Lein | B60N 3/002 296/24.34 |
| 2006/0100764 | A1 | 5/2006 | Adams et al. | |
| 2006/0208517 | A1 * | 9/2006 | Nakamura | B60R 7/04 296/37.1 |
| 2007/0205622 | A1 | 9/2007 | Whitens et al. | |
| 2008/0252122 | A1 | 10/2008 | Vallentin | |
| 2009/0115229 | A1 * | 5/2009 | Messner | A47C 7/62 297/188.1 |
| 2009/0174206 | A1 | 7/2009 | Vander Sluis et al. | |
| 2010/0109389 | A1 * | 5/2010 | Charpentier | B60N 3/004 297/173 |
| 2010/0176629 | A1 * | 7/2010 | Yamada | B60N 2/065 297/216.1 |
| 2010/0207414 | A1 | 8/2010 | Tsuda et al. | |
| 2010/0244478 | A1 | 9/2010 | DePue | |
| 2014/0252810 | A1 * | 9/2014 | Whalen | B60N 3/002 297/135 |
| 2015/0203005 | A1 * | 7/2015 | Pendlebury | B60N 3/102 297/188.14 |
| 2016/0331085 | A1 | 11/2016 | Mizumoto et al. | |
| 2017/0246973 | A1 * | 8/2017 | Farooq | B60R 7/04 |
| 2018/0065513 | A1 * | 3/2018 | Line | B60N 2/206 |
| 2018/0178700 | A1 | 6/2018 | Welch | B60N 3/002 |
| 2019/0031054 | A1 * | 1/2019 | Line | B60N 2/3011 |
| 2019/0031055 | A1 * | 1/2019 | Line | B60N 2/01 |
| 2019/0031114 | A1 * | 1/2019 | Line | B60N 2/01 |

FOREIGN PATENT DOCUMENTS

| | | | | |
|---|---|---|---|---|
| FR | 2 698 594 | | 6/1994 | |
| FR | 2 833 220 | | 6/2003 | |
| FR | 2969066 | * | 6/2012 | B60N 2/206 |
| WO | 2010144420 | | 12/2010 | |

* cited by examiner

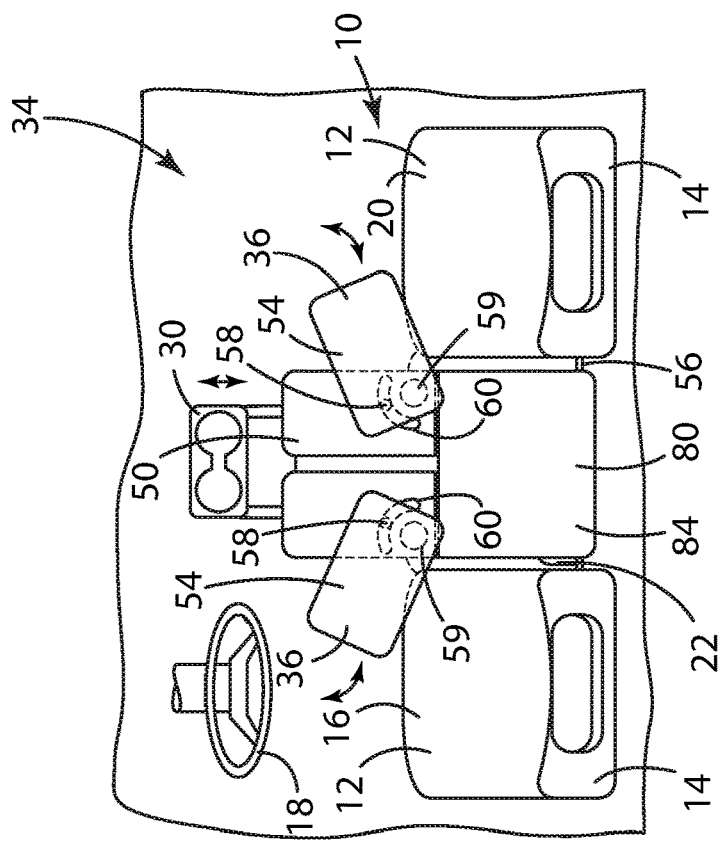

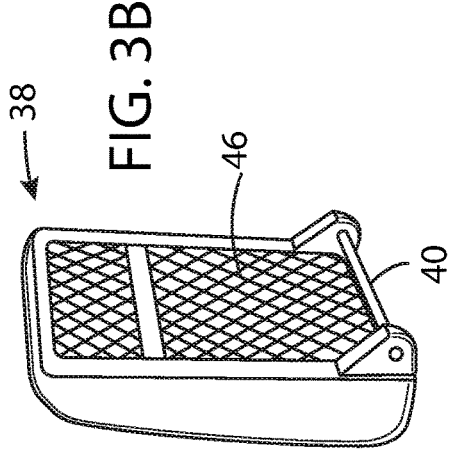
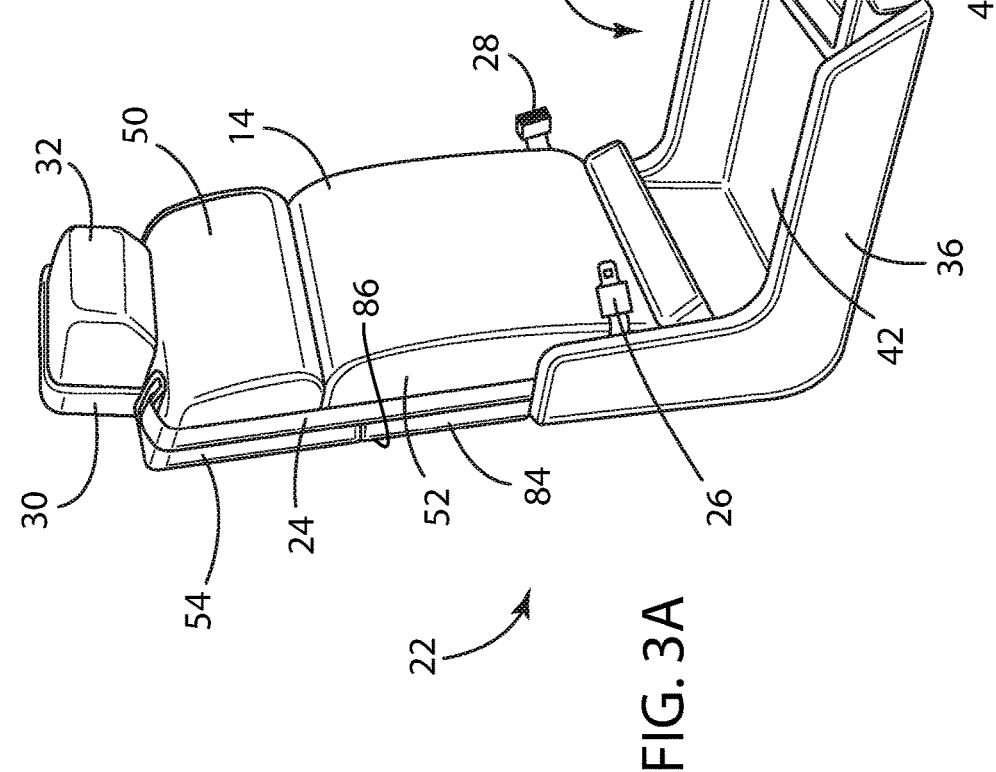

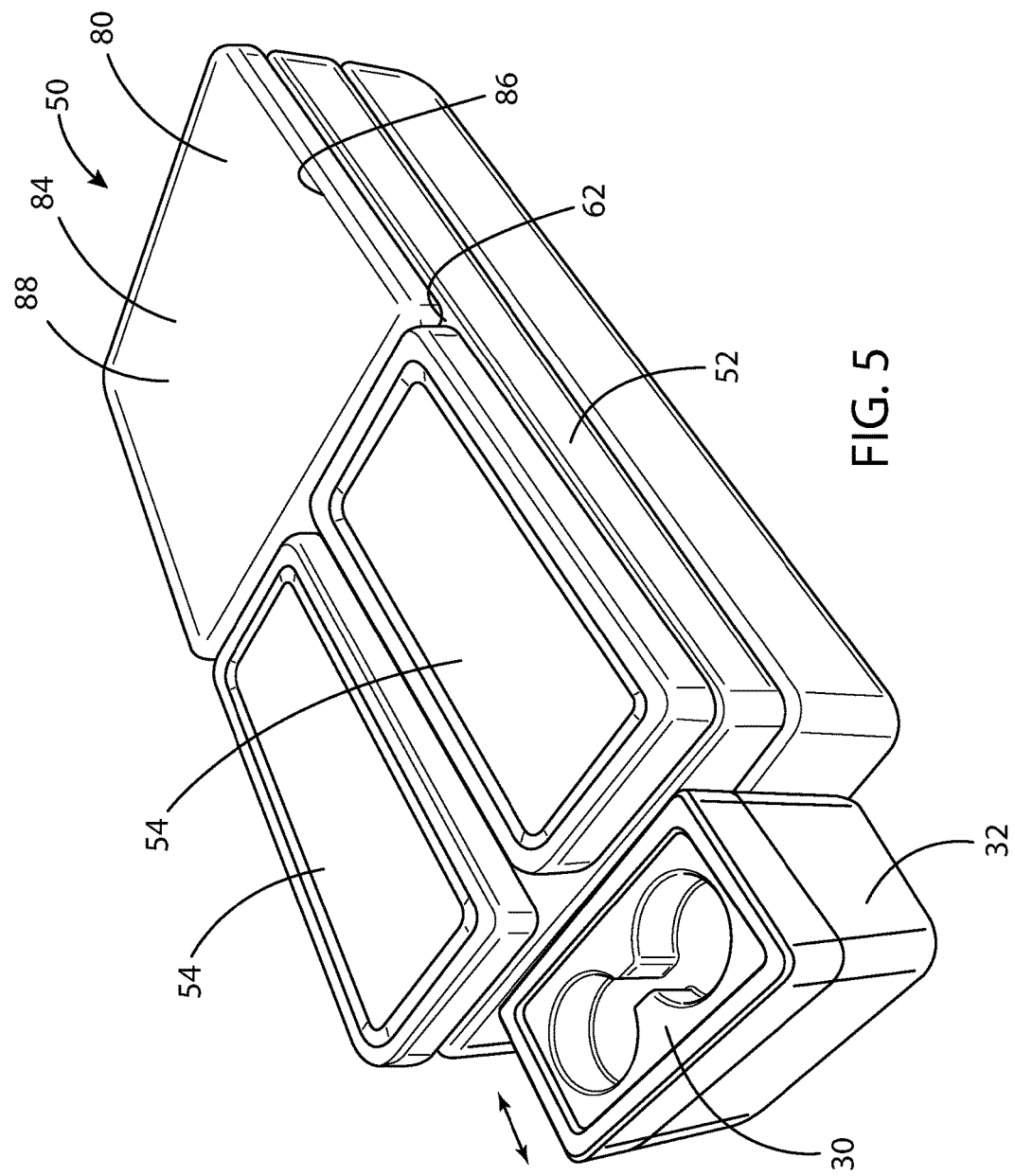

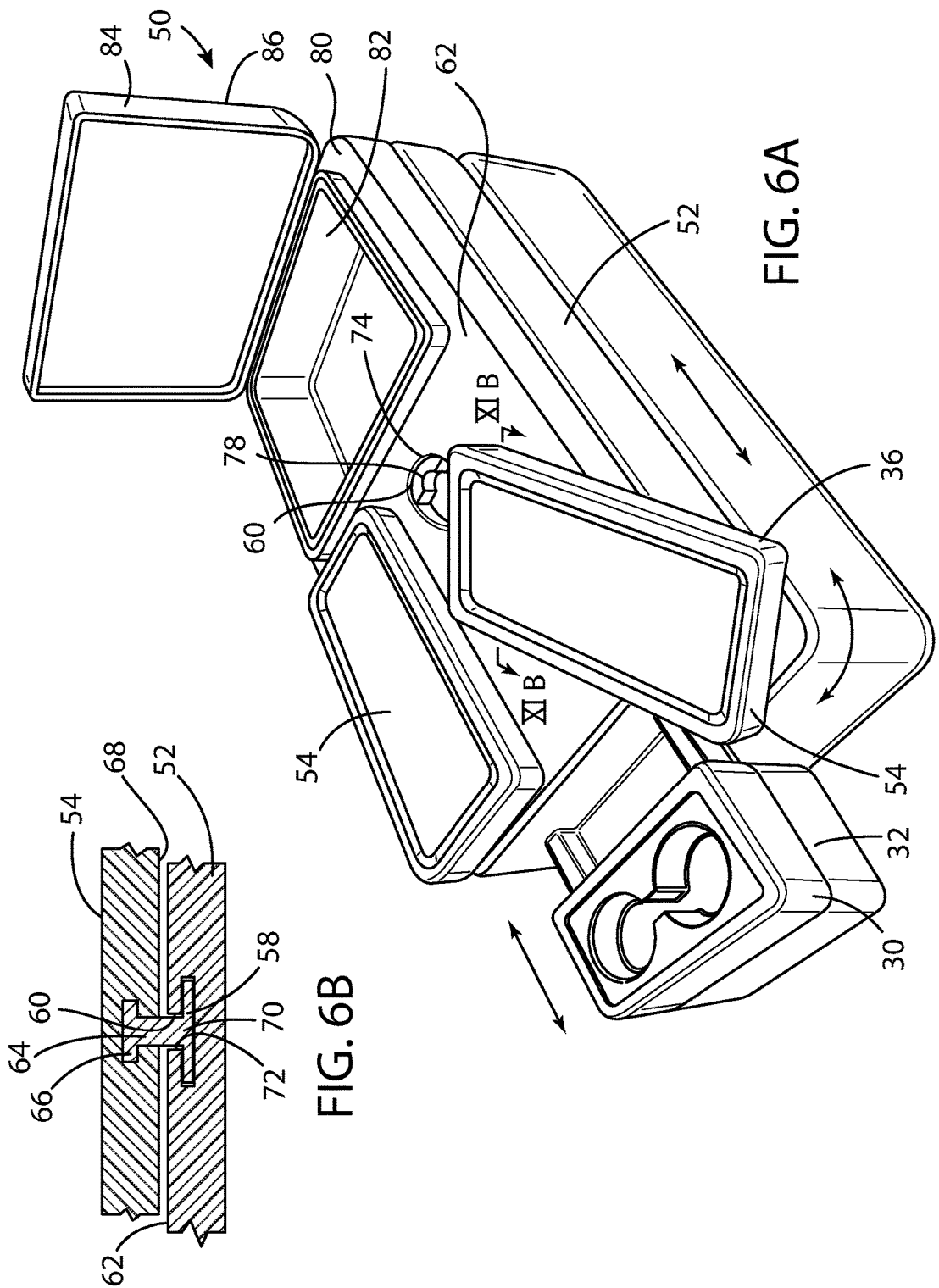

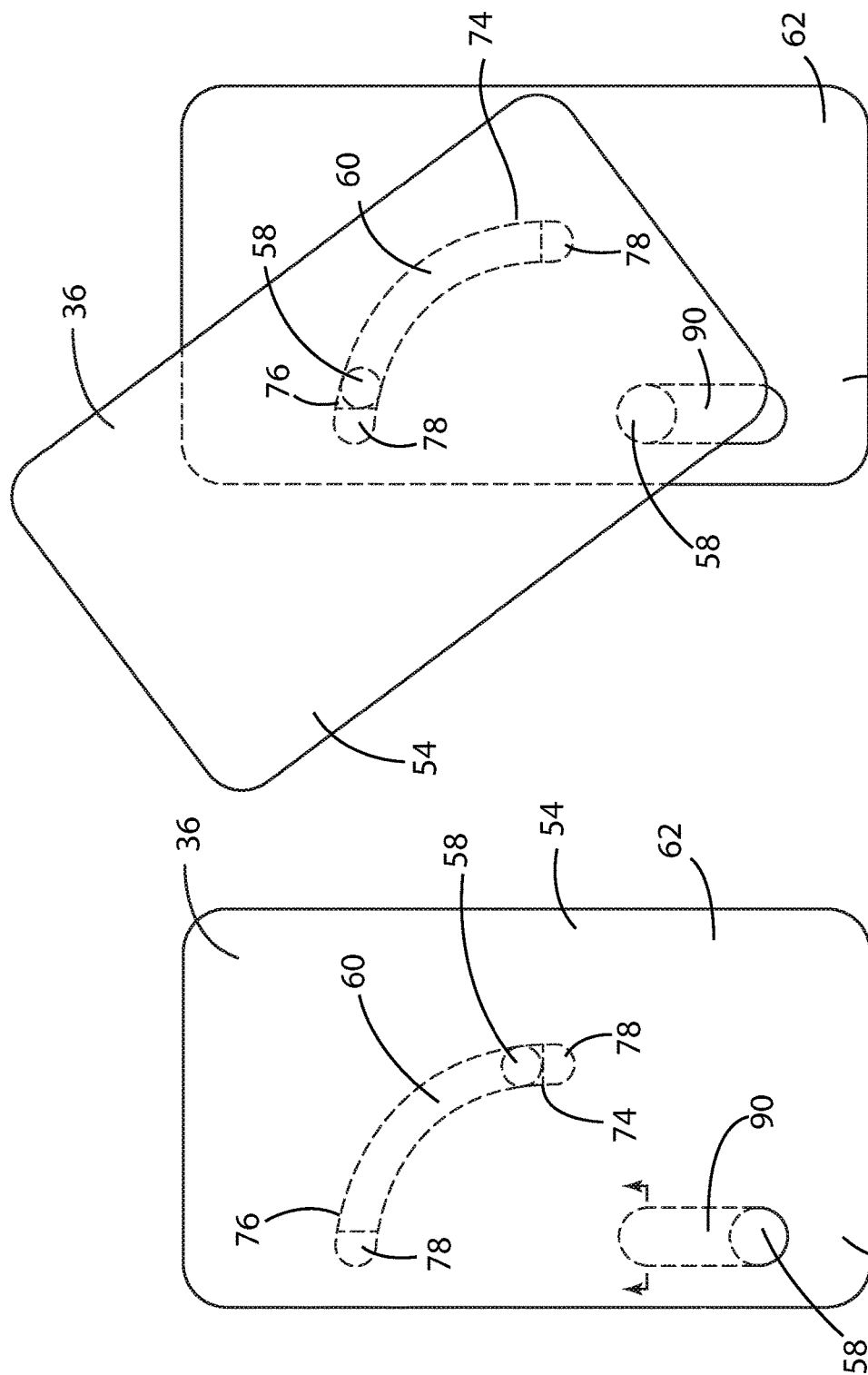

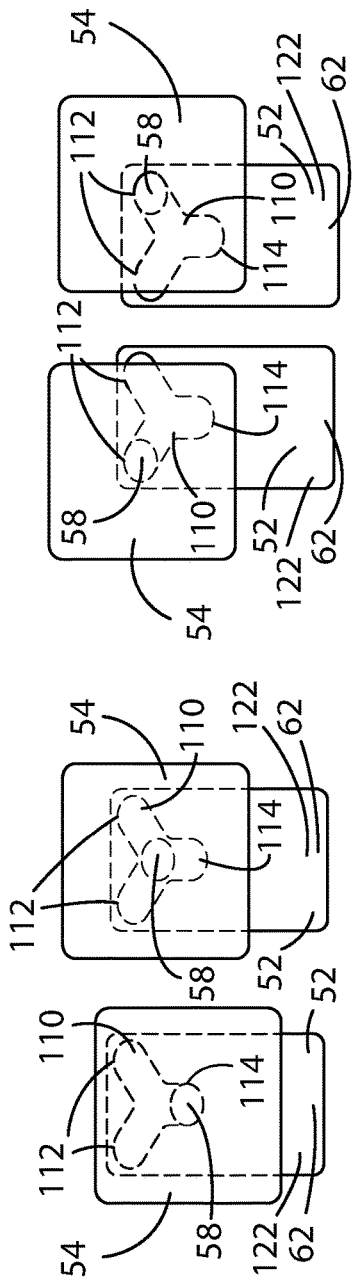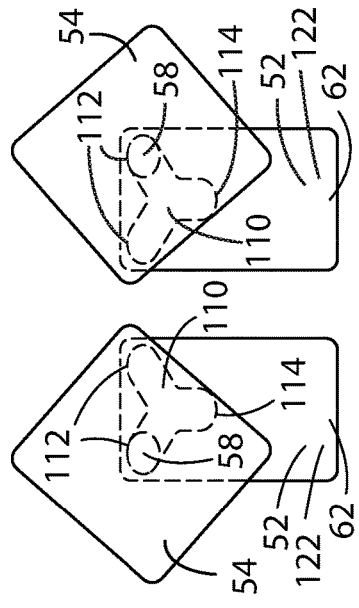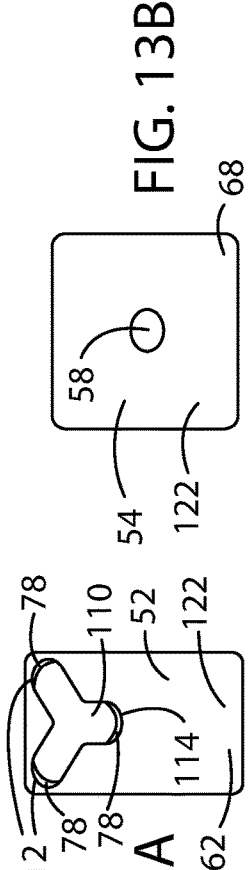

FLEXIBLE MOTOR VEHICLE WORK SURFACE FOR LAPTOPS AND TABLETS

FIELD OF THE INVENTION

The present invention generally relates to a flexible vehicle work surface for laptops and tablets, and more particularly, a center seating position that may be converted to an adaptable work surface that includes foldable wings set at an oblique angle to a deployable support structure.

BACKGROUND OF THE INVENTION

Modern motor vehicle interiors are incorporating more and sophisticated comfort-related features as designers improve their understanding of human ergonomics, posture, and comfortability. For example, motor vehicles now include features in the motor vehicle seating assembly that can provide the driver and passengers with improved comfort and increased endurance for extensive vehicle rides. Automotive customers and occupants are also looking for more uses for the limited number of surfaces available in the automotive environment to make life and work easier within the environment of the motor vehicle occupant compartment. Such individuals need flexible surfaces that meet with their mobility and connectivity needs, as well as also maximizing other features and functions in the proximity of the motor vehicle seating positions. Previous designs focused on fixed solutions that were not adept at providing mobility solutions for using current technology in the vehicle for work-place or personal needs. Additionally, these solutions largely failed to provide flexibility to both front and rear seat occupants to use these surfaces for their needs. An improved work surface to maximize fulfillment of the needs of the automotive occupants, particularly a work surface that readily adapts to variety of applications, was desired.

SUMMARY OF THE INVENTION

According to one aspect of the present disclosure, a flexible motor vehicle work surface is operably coupled with a motor vehicle seating assembly and includes a deployable support structure operably coupled with the motor vehicle seating assembly, the deployable support structure comprising a base disposed on an upper surface thereof. A foldable wing is operably coupled with the deployable support structure, the foldable wing having a first stored position and a deployed second position forming a movable horizontal surface.

Embodiments of the first aspect of the disclosure can include any one or a combination of the following features:
- A foldable wing operably coupled with the base of the deployable support structure via a hinge dispose proximate a forward portion and a side portion of the foldable wing;
- the hinge is disposed at an oblique angle to a longitudinal centerline of the flexible motor vehicle work surface;
- the hinge is disposed at an angle of about 45° of the longitudinal centerline of the flexible motor vehicle work surface;
- the upper surface of the deployable support structure and the foldable wing form a substantially continuous upper surface when in the deployed second position;
- the foldable wing further comprises an outer perimeter and a central opening defining an inner perimeter;
- the deployable support structure comprises a raised portion having an outer perimeter fittingly received within the inner diameter of the foldable wing when the foldable wing is in the first stored position;
- the upper surface of the raised portion on the base of the deployable support structure forms an openable lid having a closed position above a storage compartment and an open position providing access to the storage compartment;
- the lid is openable with the foldable wing in any of the first stored position and the second deployed position;
- a lid hinge assembly operably coupling the lid to the base of the deployable support structure, wherein the lid hinge assembly is disposed parallel to the longitudinal axis of the motor vehicle and proximate a longitudinal edge of the lid;
- a lid hinge assembly operably coupling the lid to the base of the deployable support structure, wherein the lid hinge assembly is disposed perpendicular to the longitudinal axis of the motor vehicle and proximate a lateral edge of the lid;
- a pair of foldable wings having a first stored position and a second deployed position and each operably coupled with the base of the deployable support structure, wherein each of the pair of foldable wings further comprises a hinge proximate a forward and side portion of the foldable wing at an angle oblique to the longitudinal centerline of the motor vehicle;
- a one of the pair of movable horizontal surfaces unfolding toward the driver side seating position when displaced from the first stored position to the deployed second position and the other of the pair of the movable horizontal surfaces unfolds toward the passenger side seating position when displaced from the first stored position to the deployed second position;
- the center seating position comprises about 20% of the overall motor vehicle seating assembly;
- the center seating position includes seat-integrated occupant protection restraints; and
- the rearward portion of the deployable support structure comprises a storage compartment having a lid having an open position and a closed position, wherein the movable horizontal surface and the lid form a substantially continuous horizontal surface when the lid is in the closed position.

According to a further aspect of the present disclosure, a flexible motor vehicle work surface is operably coupled with a motor vehicle seating assembly that further comprises a driver side seating position, a passenger side seating position, and a center seating position disposed between the driver side seating position and the passenger side seating position, the center seating position comprising a substantially horizontal lower seat and a substantially vertical seatback assembly. The flexible motor vehicle work surface includes a deployable support structure operably coupled with the motor vehicle seating assembly, the deployable support structure comprising a base disposed on an upper surface thereof. The deployable support structure further has a first substantially vertical orientation defining the substantially vertical seatback assembly for the center seating position and a second substantially horizontal orientation defining a substantially horizontal structure upon which the movable horizontal surface is supported. A foldable wing is operably coupled with the deployable support structure, the foldable wing having a first stored position and a deployed second position forming a movable horizontal surface.

According to another aspect of the present disclosure, a flexible motor vehicle work surface is operably coupled with a motor vehicle seating assembly that further comprises a center seating position disposed between a driver side seating position and a passenger side seating position, the center seating position comprising a substantially horizontal lower seat and a substantially vertical seatback assembly. The flexible motor vehicle work surface includes a deployable support structure operably coupled with the motor vehicle seating assembly, the deployable support structure comprising a base disposed on an upper surface thereof, a forward portion and a rearward portion the deployable support structure further having a first substantially vertical orientation defining the substantially vertical seatback assembly for the center seating position, and a second substantially horizontal orientation defining a substantially horizontal structure upon which the movable horizontal surface is supported. A foldable wing is operably coupled with a forward portion of the deployable support structure, the foldable wing having a first stored position and a deployed second position forming a movable horizontal surface.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1 is a top view of a motor vehicle seating assembly having a center seating position equipped with a first embodiment of the flexible motor vehicle work surface in accordance with the present disclosure, wherein a movable horizontal surface is in a first stored position;

FIG. 2 is a top view of the flexible motor vehicle work surface of FIG. 1 in accordance with the present disclosure, wherein the movable horizontal surface is in a second deployed position;

FIG. 3A is a front side perspective view of the flexible motor vehicle work surface of FIG. 1 in accordance with the present disclosure, wherein a deployable support structure is in a first substantially vertical orientation and a substantially horizontal lower seat of the motor vehicle seating assembly is in a forward open orientation;

FIG. 3B is a rear side perspective view of the substantially horizontal lower seat of the motor vehicle seating assembly of FIG. 3A in the forward open orientation;

FIG. 5 is a front side perspective view of the flexible motor vehicle work surface of FIG. 1 in accordance with the present disclosure, wherein the movable horizontal surface is in the first stored position;

FIG. 6A is a front side perspective view of the flexible motor vehicle work surface of FIG. 1 in accordance with the present disclosure, wherein the movable horizontal surface is in the second deployed position;

FIG. 6B is a cross-sectional view of the upper surface of the deployable support structure of the flexible motor vehicle work surface, integrated guide member, and movable horizontal surface of the flexible motor vehicle work surface of FIG. 1 in accordance with the present disclosure taken long the line XIB-XIB in FIG. 6A;

FIG. 7 is top view of an additional embodiment of the flexible motor vehicle work surface of FIG. 1 in accordance with the present disclosure, wherein the movable horizontal surface is in the first stored position;

FIG. 8 is a top view of the flexible motor vehicle work surface of FIG. 7 in accordance with the present disclosure, wherein the movable horizontal surface is in the second deployed position;

FIGS. 12A-12H are top views of the flexible motor vehicle work surface of FIG. 11, wherein the movable work surface is in a plurality of deployed positions;

FIG. 13A is a top view of the deployable support structure of FIG. 11;

FIG. 13B is a bottom view of the movable work surface of FIG. 11;

DETAILED DESCRIPTION OF THE PREFERRED EMBODIMENTS

Figure 4:
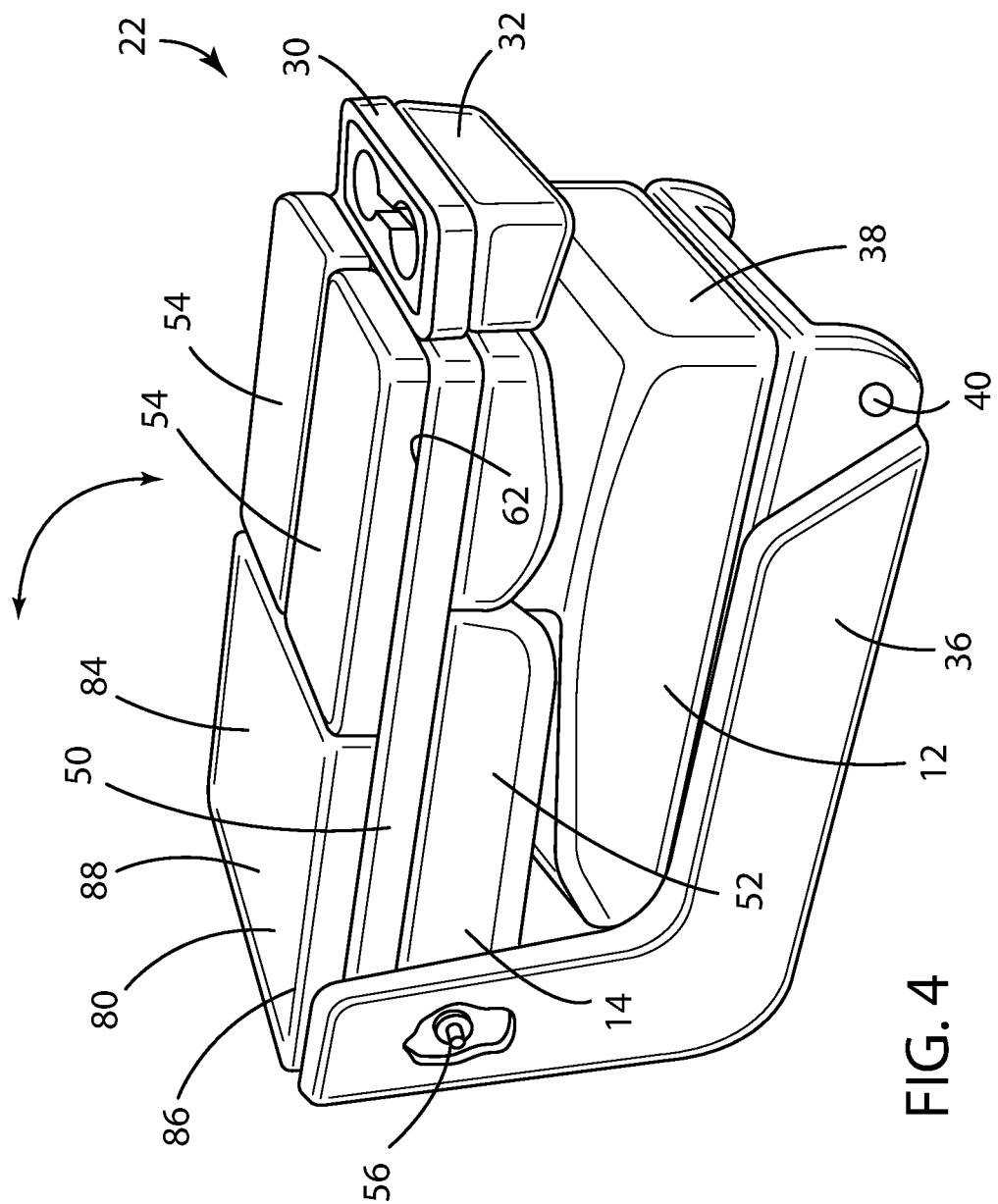
FIG. 4 is a front side perspective view of the flexible motor vehicle work surface of FIG. 1 in accordance with the present disclosure, wherein the deployable support structure is in a second substantially horizontal orientation and the movable horizontal surface is in the first stored position.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1 and 2, reference numeral 10 generally designates a motor vehicle seating assembly for a motor vehicle (not shown). As is typical, the motor vehicle seating assembly 10 has a lower seat assembly 12 and an upwardly extending seatback assembly 14. As shown, the motor vehicle seating assembly 10 is provided with a driver side seating position 16 disposed behind a steering wheel 18, a passenger side seating position 20, and a center seating position 22. Preferably, the center seating position 22 represents approximately 20% of the width of the motor vehicle seating assembly 10. The motor vehicle seating assembly 10 of the present disclosure is particularly adapted for use in light truck applications, but it should be appreciated that the motor vehicle seating assembly 10 of the present disclosure can also be beneficially applied to more traditional passenger motor vehicles, such as sedans and/or coupes.

As noted further herein, various embodiments of the present disclosure are presented, where common or similar structures are identified with the same reference numerical for ease of presentation and comprehension. The various embodiments of the present disclosure include multiple variants on the center seating position 22, each of which preferably includes a seat-integrated restraint system 24 having a tongue 26 and buckle 28 connector assemblies, as is known, for use when the center seating position 22 is occupied by a motor vehicle occupant. Further, each of the embodiments described herein is intended to include an integrated cupholder assembly 30 mounted on the upper portion of the seatback assembly 14 of the center seating position 22, which also includes a head restraint 32 on an opposite side thereof for the center seating position 22. The center seating position 22 head restraints 32 may be removed, along with the cupholder assembly 30, and may be moved around the motor vehicle occupant compartment 34 and assembled into an armature holder to allow ease of movement of the cupholder assembly 30. In addition, with the seatback assembly 14 in a forward stowed position, as shown in FIG. 4, the center seating position 22 head restraints 32 may be displaced forward and rearward relative the longitudinal axis of the motor vehicle, as may be desired by the motor vehicle occupants, to move the cupholder assembly 30 forward and rearward, as shown in FIGS. 1 and 2.

As shown in FIGS. 1 through 10, the center seating position 22 of the motor vehicle seating assembly 10 includes a mounting base 36 to which a substantially horizontal lower seat 38 of the motor vehicle seating assembly 10 may be operably coupled. The substantially horizontal lower seat 38 further preferably is provided with a forward hinge assembly 40 about which the substantially horizontal lower seat 38 may be pivoted relative the mounting base 36 between a closed orientation and an open orientation. The mounting base 36 is preferably operably coupled with the motor vehicle seating assembly 10 and includes a storage compartment 42 disposed below the substantially horizontal lower seat 38 when the substantially horizontal lower seat 38 is in the closed orientation, as best shown in FIG. 3A. A bottom surface 44 of the substantially horizontal lower seat 38 is preferably provided with storage netting 46 within which items may be stored when the substantially horizontal lower seat 38 is in the closed orientation.

A first embodiment of the flexible motor vehicle work surface 50 includes a deployable support structure 52 operably coupled with the mounting base 36 of the motor vehicle seating assembly 10 and a movable horizontal surface 54 operably coupled with the deployable support structure 52. Preferably, all of the mounting base 36, the deployable support structure 52, and the movable horizontal surface 54 are fabricated from an injection molded polymer. The deployable support structure 52 has a first substantially vertical orientation defining the substantially vertical seatback assembly 14 for the center seating position 22 and a second substantially horizontal orientation defining a substantially horizontal structure upon which the movable horizontal surface 54 is supported. The deployable support structure 52 further includes a rear pivot assembly 56 about which the deployable support structure 52 may be folded between the first substantially vertical orientation and the second substantially horizontal orientation. A latch mechanism (not shown) may be employed, if desired, to fix the deployable support structure 52 in either of the first substantially vertical orientation or the second substantially horizontal orientation. When the substantially horizontal lower seat 38 is in the closed orientation, the substantially horizontal lower seat 38 supports the deployable support structure 52 when the deployable support structure 52 is folded to the forward substantially horizontal orientation, as shown in FIG. 4.

As shown in FIGS. 1-10, the movable horizontal surface 54 is operably coupled with the deployable support structure 52 via an integrated guide member 58 movably restrained within an arcuate recess 60 disposed on an upper surface 62 of the deployable support structure 52. The arcuate recess 60 thus defines an arcuate travel path, which provides a generous and comfortable path for the movable horizontal surface 54 about the body of an occupant seated in either of the driver side or passenger side seating positions 16, 20, respectively. The integrated guide member 58 preferably acts as a pivot and is fixed to one of either the movable horizontal surface 54 or the deployable support structure 52 and is pivotally attached to the other of the movable horizontal surface 54 or the deployable support structure 52, whereby the movable horizontal surface 54 may be pivoted relative the deployable support structure 52. Preferably, a pin 64 forms the integrated guide member 58, wherein an enlarged end 66 of the pin 64 is fixedly molded into a lower surface 68 of the movable horizontal surface 54 and is provided with an opposed oversized head 70 received within a T-slot 72 embedded in the upper surface 62 of the deployable support structure 52, as shown in FIG. 6B.

The movable horizontal surface 54 preferably has a first stored position and a second deployed position, as shown in FIGS. 1 and 2, respectively. In a first embodiment, a pair of movable horizontal surfaces 54 may be provided in lateral side-by-side relation to one another. In such embodiment, one of an opposing pair of integrated guide members 58 is each movable within one of a pair of arcuate recesses 60 disposed on the upper surface 62 of the deployable support structure 52, as shown in FIGS. 1 and 2. As shown, each of the pair of movable horizontal surfaces 54 may have a first stored position and a second deployed position and each are operably coupled with a one of the pair of the integrated guide members 58. Each of the pairs of integrated guide members 58 defines a pivot point movable within the arcuate recesses 60.

When either of the movable horizontal surfaces 54 is manually manipulated from the first stored position to the second deployed position, the movable horizontal surface 54 may be pivoted toward one of the driver or passenger side seating position 16, 20, respectively, about the aforementioned arcuate path. When so manipulated, the movable horizontal surfaces 54 provide an increased and improved work surface upon which the motor vehicle occupants may support various items, such as laptop computers, tablets, and paperwork.

In any of the embodiments contained herein, it should be noted that the movable horizontal surface 54 may employ a locking feature (not shown) to allow the movable horizontal surface 54 to be restrained in either of the first stored position or the second deployed position, such as a detent or a lock and striker mechanism, as is known.

As shown in FIGS. 1 through 8, the arcuate recess 60 has a first end 74 and a second end 76. A damper mechanism 78 is preferably disposed at each of the first end 74 of the arcuate recess 60 and the second end 76 of the arcuate recess 60, whereby movement from the first stored position to the second deployed position does not cause the movable horizontal surface 54 to suffer any abrupt forces generated upon impact with either end 74, 76 of the arcuate recess 60 and thereby avoid a hard end-stop impact. Preferably, each of the damper mechanisms 78 includes a resilient member that engages the integrated guide member 58 at the one of the first end 74 of the arcuate recess 60 and the second end 76 of the arcuate recess 60. Even more preferably, the damper mechanism 78 comprises an elastomeric material, such as a synthetic rubber.

The rearward portion 80 of the deployable support structure 52 further preferably includes a storage compartment 82 disposed at a rearward portion thereof, as shown in FIGS. 4-6A. The storage compartment 82 is preferably provided with a lid 84 having an open position and a closed position, wherein the movable horizontal surface 54 and the lid 84 form a substantially continuous horizontal surface when the movable horizontal surface 54 is in the first stowed position and the lid 84 is in the closed position. An upper surface of the lid 86 preferably includes a padded surface 88 upon which an elbow of an occupant may be comfortably supported, as is known.

FIGS. 7-10 show another embodiment of the present disclosure and disclose a single movable horizontal surface 54 that is mounted to the upper surface 62 of the deployable support structure 52. In this embodiment, the deployable support structure 52 is provided with a first arcuate recess 60, as previously disclosed, as well as a second linear recess 90, each of which slidably engages a first and second integrated guide members 58 fixedly attached to a lower surface 68 of the movable horizontal surface 54, and pivotably attached to the upper surface 62 of the deployable support structure 52. The first arcuate recess 60 is preferably offset from the second linear recess 90, such that the movable horizontal surface 54 is constrained in movement between the first stored position to the second deployed position in a substantially fixed arcuate path toward the driver side seating position 16. Each of the pair of first and second integrated guide members 58 further acts as an integrated pivot movable within the first arcuate recess 60 and the second linear recess 90, respectively, so as to allow only arcuate motion.

Figure 9:
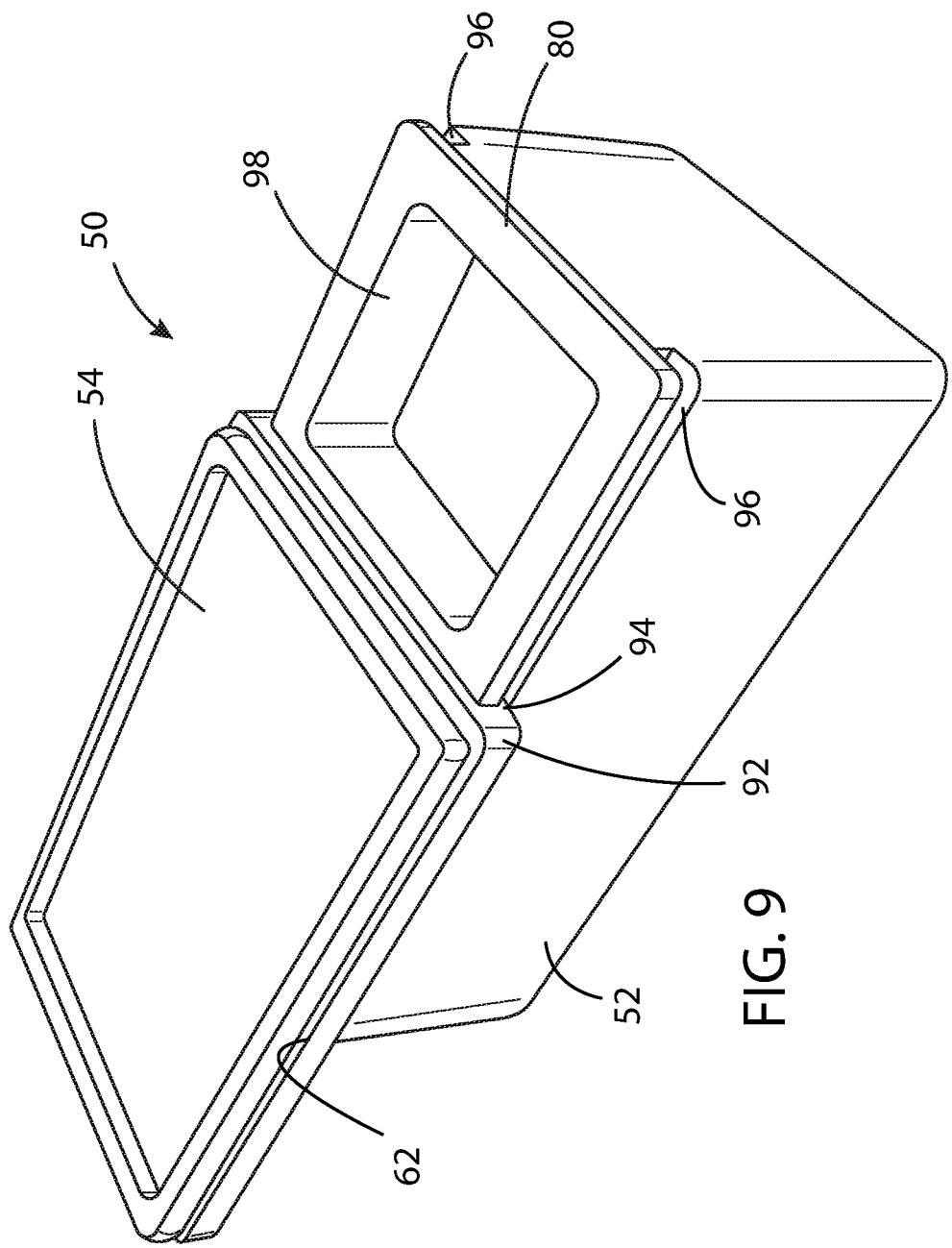
FIG. 9 is a rear side perspective view of yet another embodiment of the flexible motor vehicle work surface in accordance with the present disclosure, wherein a movable base supporting the movable horizontal surface is in a forward position.
Figure 10:
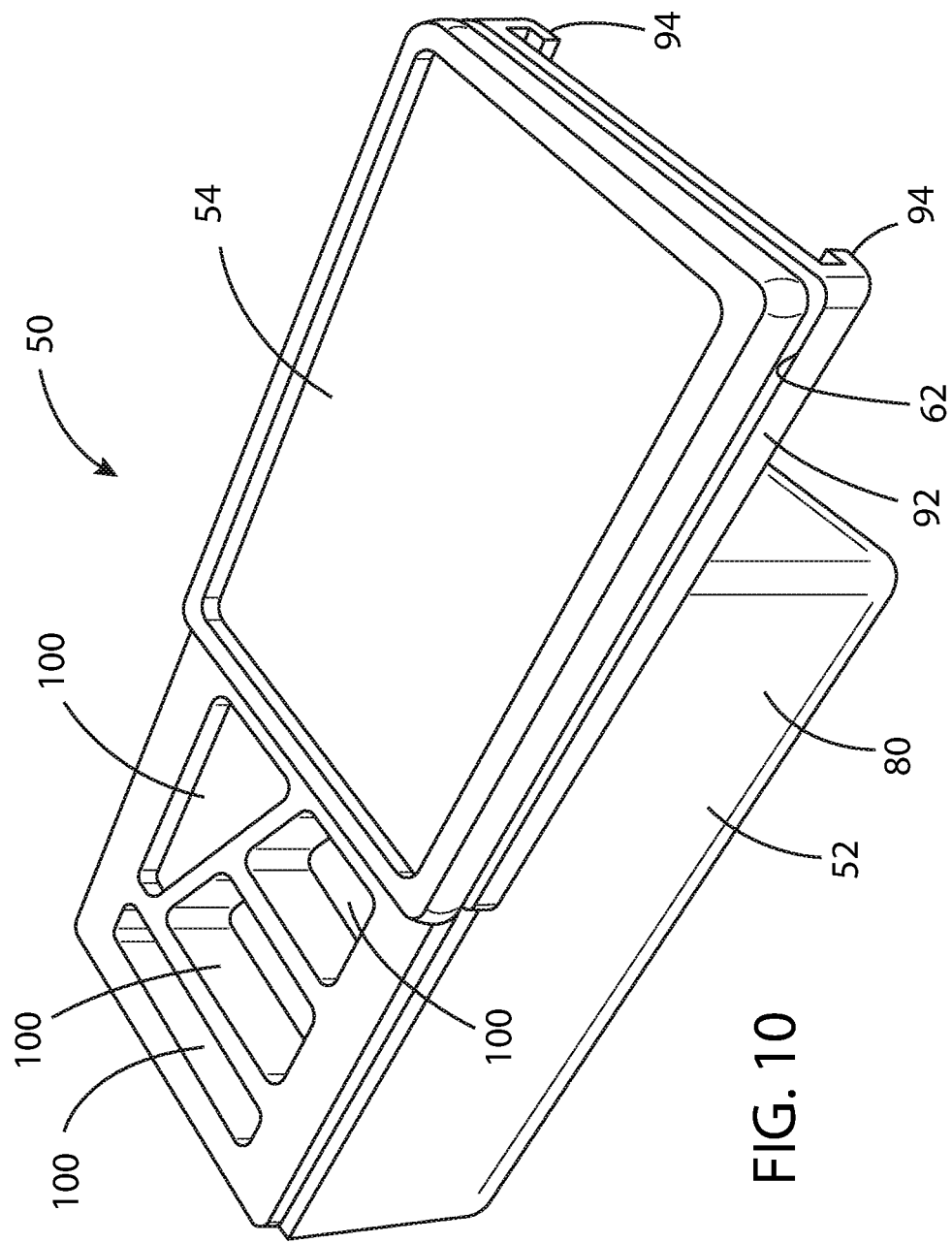
FIG. 10 is a rear side perspective view of the flexible motor vehicle work surface of FIG. 9 in accordance with the present disclosure, wherein the movable base supporting the movable horizontal surface is in a rearward position.

As shown in FIGS. 9 and 10, the deployable support structure 52 may also be provided with a movable base 92 slidably attached to the deployable support structure 52 via a pair of tabs 94, one each provided on either side of the movable base 92 that engages a pair of grooves 96 provided one each on either side of the deployable support structure 52. When the movable base 92 is displaced to a forward position, a rear storage compartment 98 may be exposed within which relatively large articles be safely stored, as best seen in FIG. 9. When the movable base 92 is displaced to a rearward position, a plurality of forward storage compartments 100 may be exposed within which relatively smaller articles may be safely stored, as shown in FIG. 10. In addition, when in the rearward position, the movable horizontal surface 54 may be accessible to rear occupants to utilize the movable horizontal surface 54 as a work or activity surface. Either of the earlier embodiments of the movable horizontal surface 54, arranged in pairs or singly, may be operably coupled with the movable base 92, as described above.

A further embodiment is disclosed in FIGS. 11-13B. As in the prior embodiments, the flexible motor vehicle work surface 50 preferably includes a deployable support structure 52 operably coupled with the motor vehicle seating assembly 10. In this embodiment, the deployable support structure 52 preferably is provided with an integrated guide member 58 movable within a Y-shaped slot 110 disposed on the upper surface 62 thereof. The lower surface 68 of the movable horizontal surface 54, as best seen in FIG. 13B, is operably coupled with the integrated guide member 58 received within the Y-shaped slot 110 provided in the upper surface 62 of the deployable support structure 52, as best seen in FIG. 13A. As in the previous embodiments, the Y-shaped slot 110 is formed as a T-slot embedded in the upper surface 62 of the deployable support structure 52 that receives the oversized head 70 of the pin 64. The enlarged end 66 is also fixedly molded to the lower surface 68 of the movable horizontal surface 54. Also, as in the previous embodiments, the movable horizontal surface 54 has a first stored position. However, the second deployed position is represented by a plurality of deployed positions, as shown in FIGS. 12A-12H. The integrated guide member 58 likewise further defines an integrated pivot point movable within the Y-shaped slot 110, as described above.

The Y-shaped slot 110 is preferably provided with a pair of forward ends 112 and a rearward end 114. The deployable support structure 52 further comprises a damper mechanism 78 preferably disposed at one of the pair of forward ends 112 of the Y-shaped slot 110 and the rearward end 114 of the Y-shaped slot 110, wherein the damper mechanism 78 comprises a resilient member that engages the integrated guide member 58 at the one of the pair of forward ends 112 of the Y-shaped slot 110 or the rearward end 114 of the Y-shaped slot 110. As in the previous embodiments and as shown in FIGS. 12A-12H, the movable horizontal surface 54 may pivot toward one of each of the driver side seating position 16 and passenger side seating position 20 when displaced from the first stored position to any of the plurality of deployed second positions.

Figure 11:
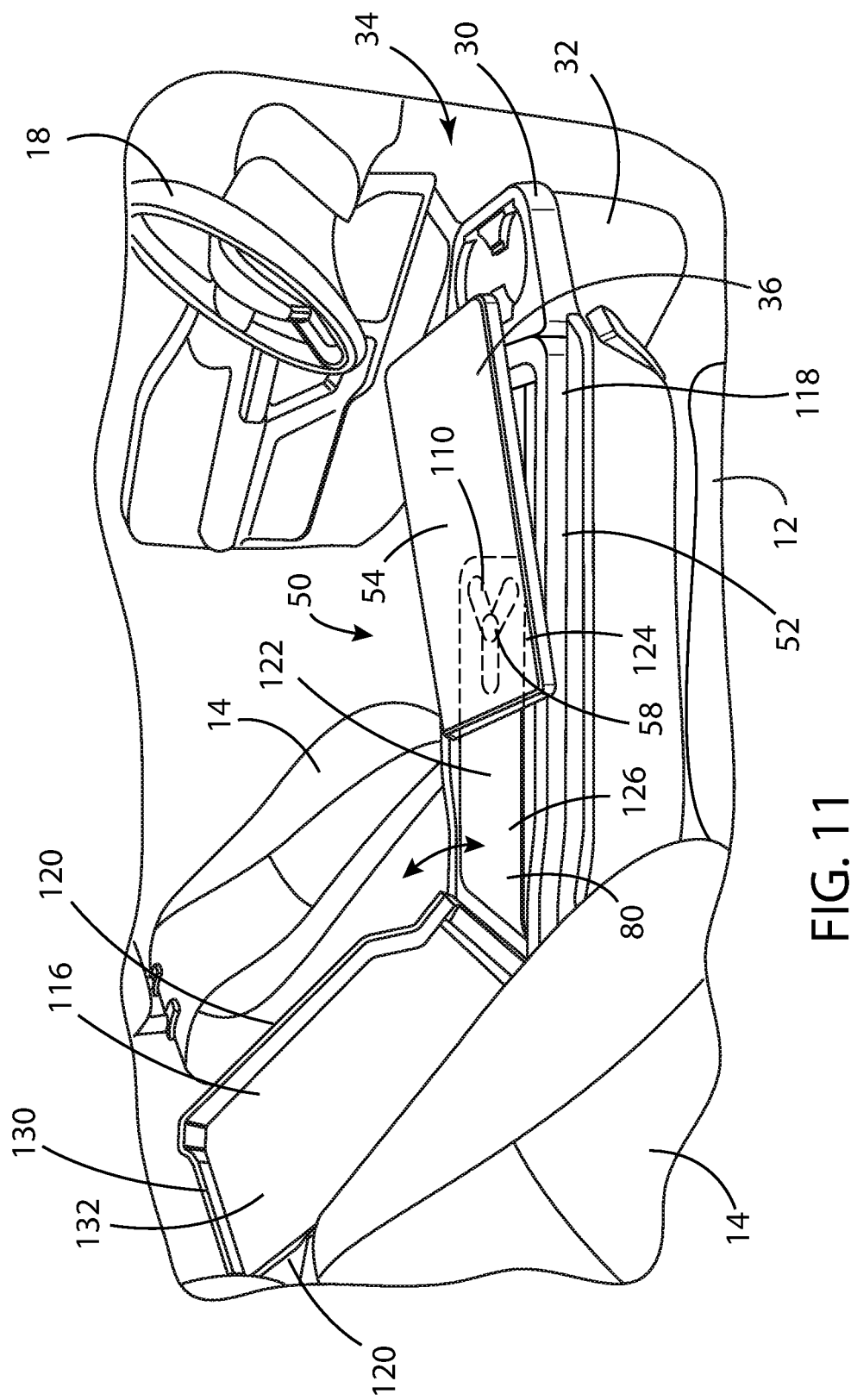
FIG. 11 is a side perspective view of a further embodiment of the flexible motor vehicle work surface in accordance with the present disclosure, wherein the movable work surface is in a second deployed position
Figure 14:
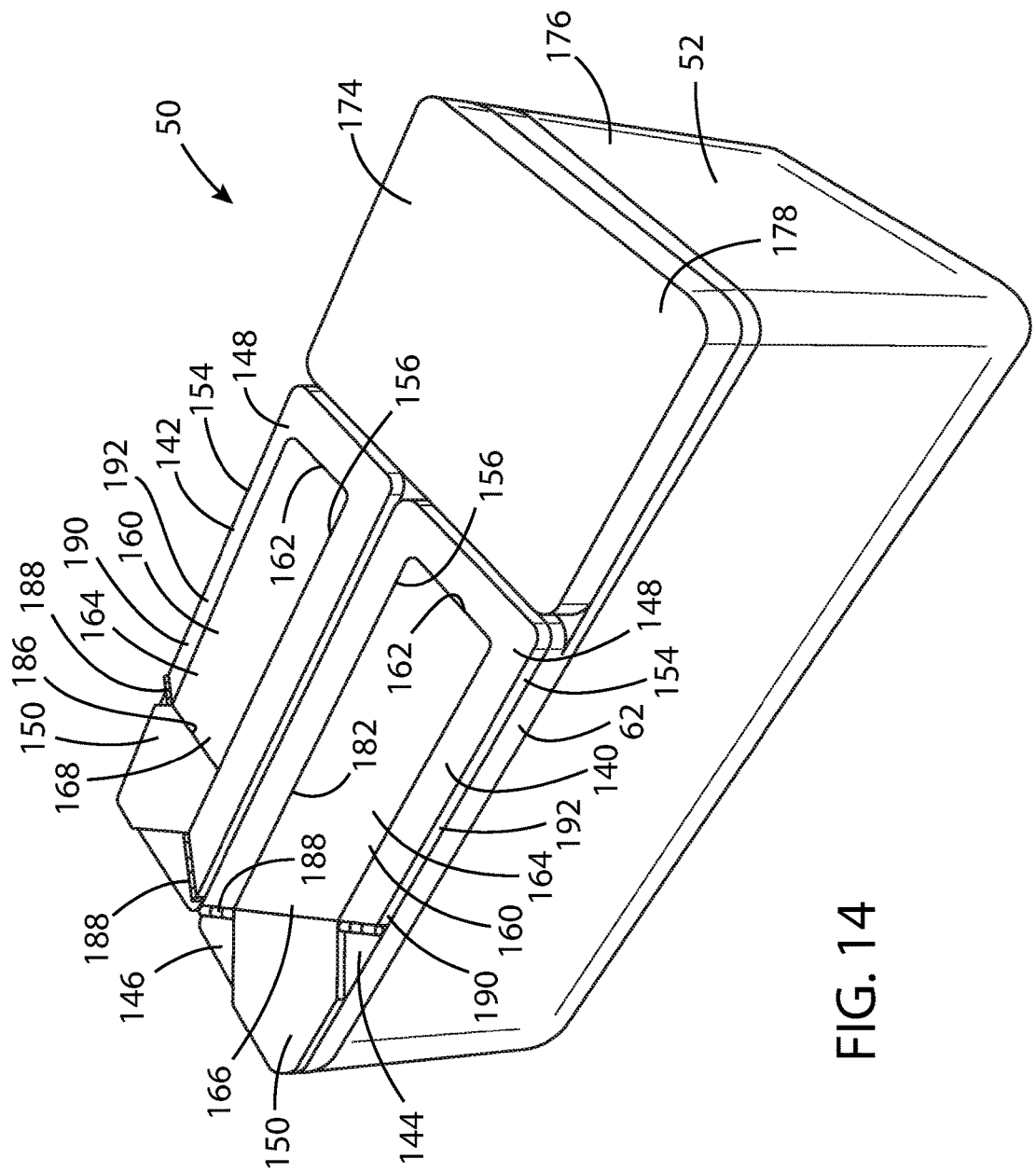
FIG. 14 is a rear side perspective view of still another embodiment of the flexible motor vehicle work surface in accordance with the present disclosure, wherein the movable horizontal surfaces are in a first stored position, and a first, second, and a third openable lid are in a closed position.
Figure 15:
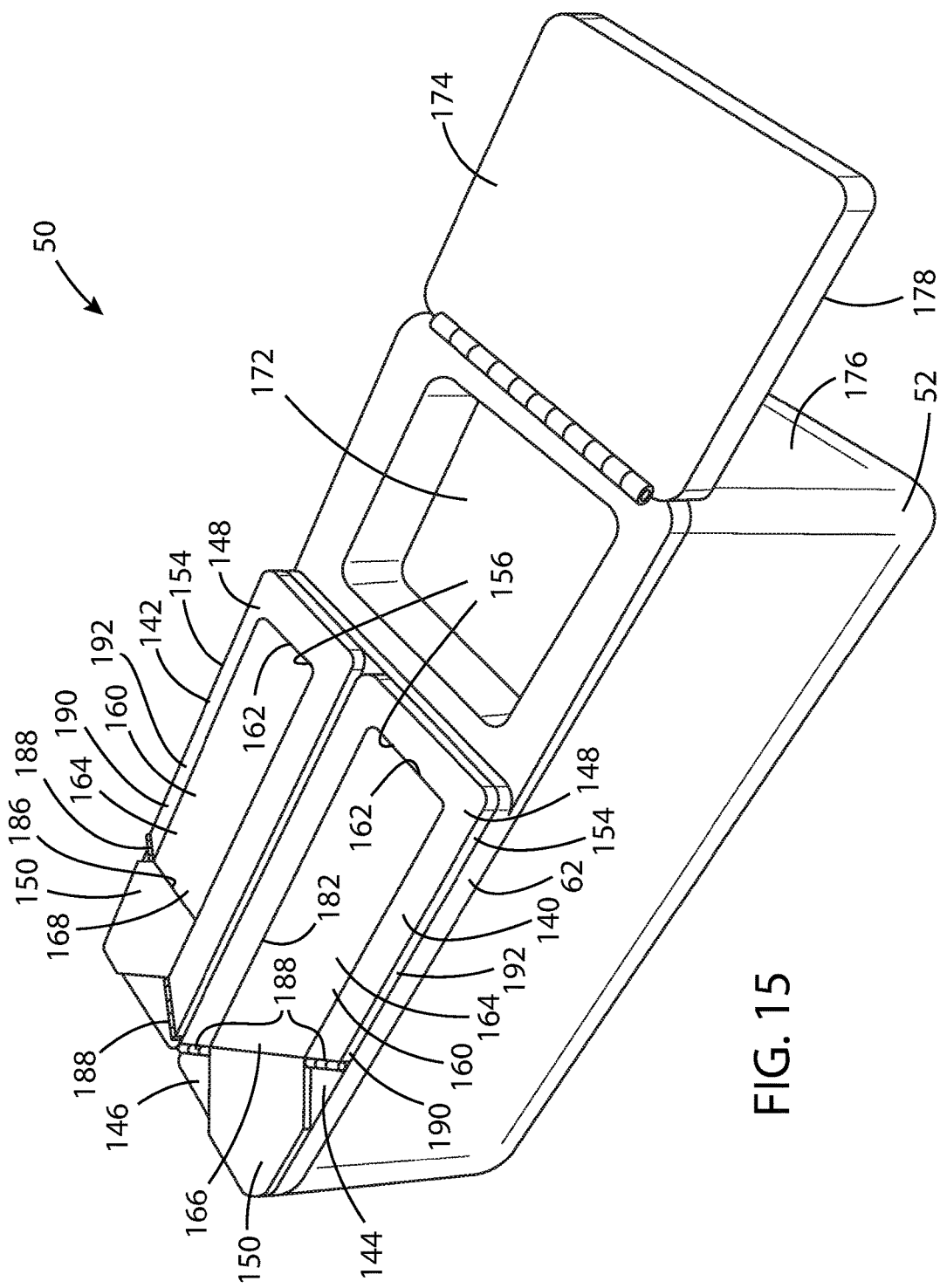
FIG. 15 is a rear side perspective view of the flexible motor vehicle work surface of FIG. 14 in accordance with the present disclosure, wherein the movable horizontal surfaces are in a first stored position, the first and the second openable lids are in a closed position, and the third openable lid is in an open position.

As shown in FIG. 11, the flexible motor vehicle work surface 50 further preferably may include a closure lid 116 attached to a rearward portion 80 of the deployable support structure 52. As shown, the closure lid 116 has an open position and a closed position, wherein in the open position, the movable horizontal surface 54 is exposed for movement between the first stored position and one of the plurality of deployed positions. In order to provide an aesthetically pleasing appearance, a recess 118 may be disposed along opposite sides of the deployable support structure 52 within which is received opposite side edges 120 of the closure lid 116 when the closure lid 116 is in the closed position.

Further, the deployable support structure 52 may also include a pivotal base 122 having a forward portion 124 and a rearward portion 126, whereby the movable horizontal surface 54 is operably coupled with the Y-shaped slot 110, which is preferably disposed on the forward portion 124 of the pivotal base 122 of the deployable support structure 52. A forward storage compartment 128 may be disposed below and forward of the forward portion 124 of the pivotal base 122 of the deployable support structure 52, within which relatively large items may be stored. When the movable horizontal surface 54 is in the first stored position, access to the forward storage compartment 128 may be directly obtained. Conversely, when the movable horizontal surface 54 is in any of the plurality of the deployed positions, access to the forward storage compartment 128 is not available, unless the pivotal base 122 is pivoted to a raised position. Preferably, when the movable horizontal surface 54 is in one or more of the plurality of deployed second positions, a cutout 130 in a forward edge 132 of the closure lid 116 allows the closure lid 116 to be moved to the closed position to form a substantially continuous horizontal surface with the movable horizontal structure.

An additional embodiment is disclosed in FIGS. 14-18. As in the previous embodiments, the flexible motor vehicle work surface 50 preferably is likewise coupled with the motor vehicle seating assembly 10 via a deployable support structure 52. In this embodiment, the flexible motor vehicle work surface 50 preferably is provided with a pair of foldable wings 140, 142 operably coupled with a stationary base 144 disposed on a forward portion 146 of the upper surface 62 of the deployable support structure 52, wherein each of the pair of foldable wings 140, 142 has a first stored position and a deployed second position forming a movable horizontal surface 54.

Preferably, each of the pair of foldable wings 140, 142 has an exposed upper surface 148 that forms the substantially continuous surface with the exposed upper surface 150 of the deployable support structure 52 when in the first stored position. In addition, each of the pair of foldable wings 140, 142 preferably has an exposed lower surface 152 that forms a substantially continuous surface with the exposed upper surface 150 of the deployable support structure 52 when in the second deployed position.

Figure 16:
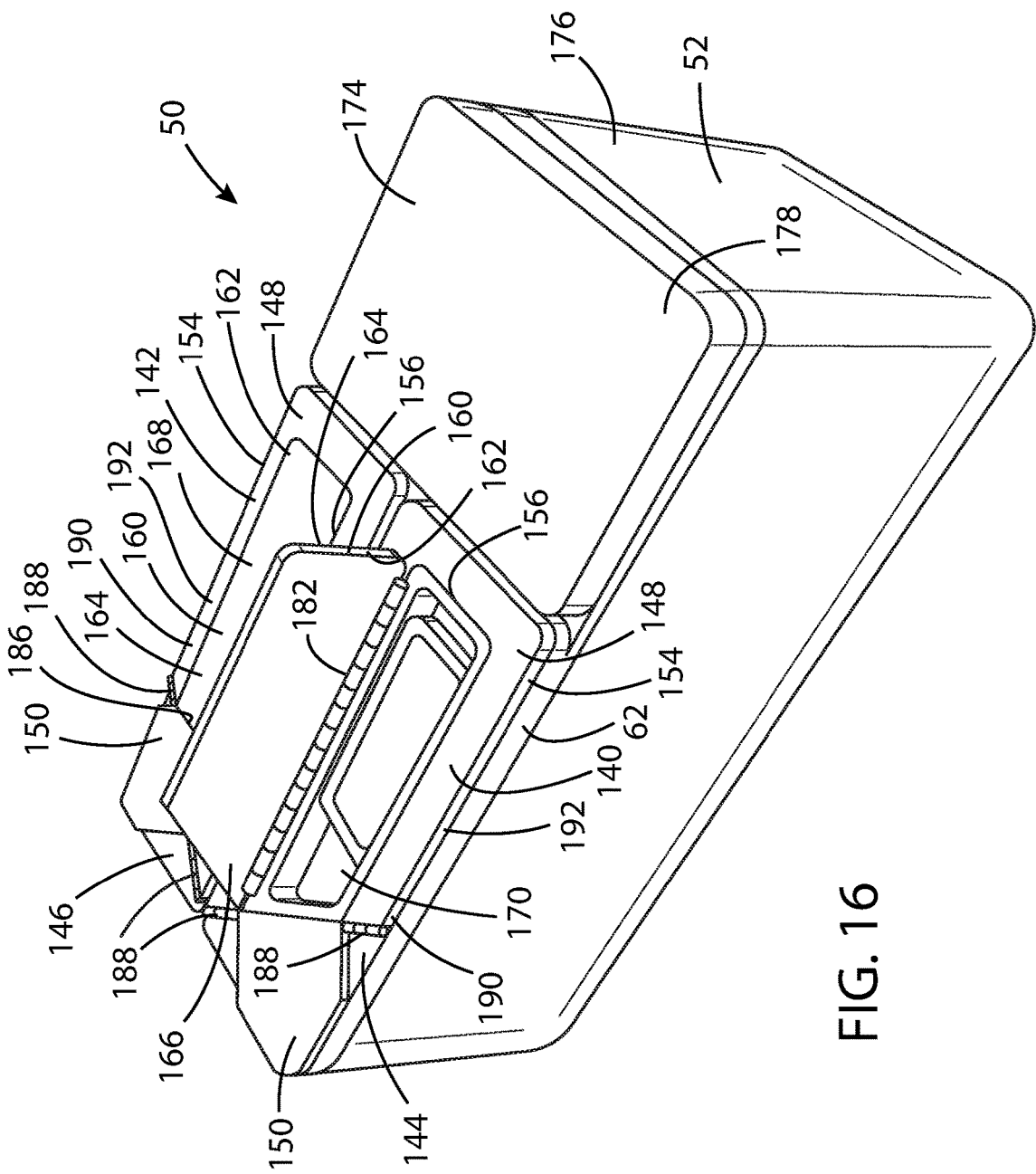
FIG. 16 is a rear side perspective view of the flexible motor vehicle work surface of FIG. 14 in accordance with the present disclosure, wherein the movable horizontal surfaces are in a first stored position, the first openable lid is an open position, and the second and third openable lids are in the closed position.
Figure 17:
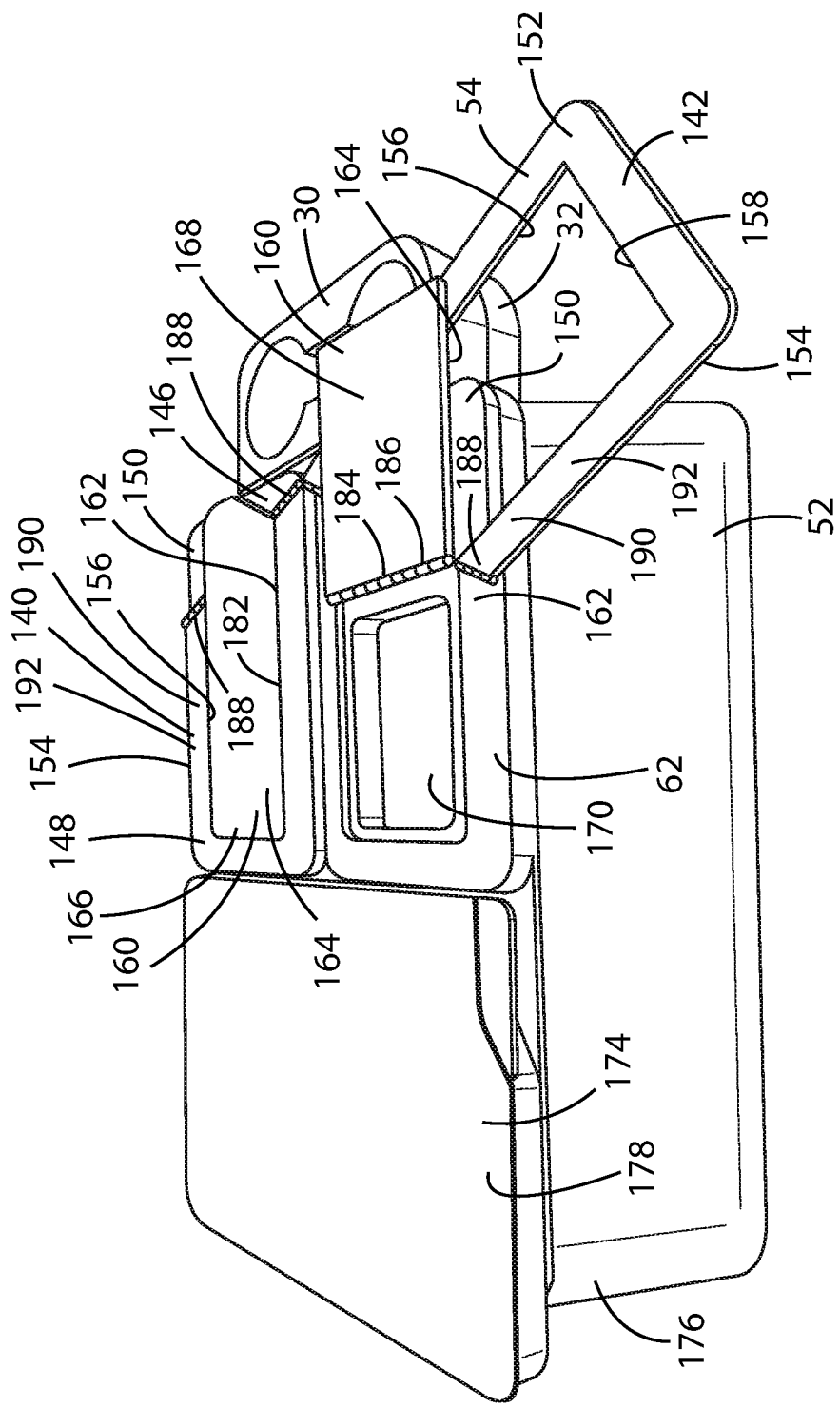
FIG. 17 is a side perspective view of the flexible motor vehicle work surface of FIG. 14 in accordance with the present disclosure, wherein one of the pair of movable horizontal surfaces is in a first stored position, another of the pair of movable horizontal surfaces in a second deployed position, the second openable lid is in an open position, and the first and third openable lids are in the closed position.
Figure 18:
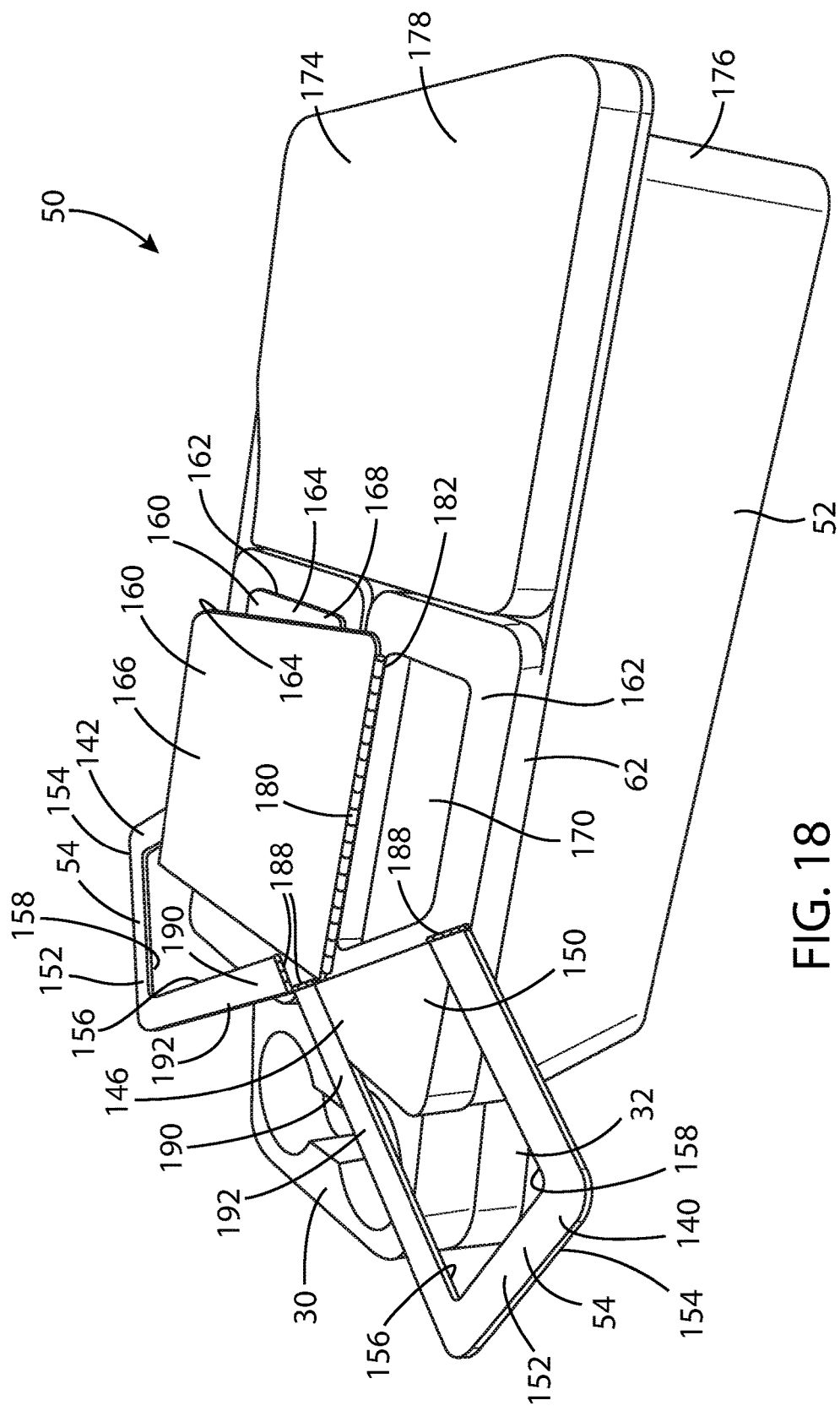
FIG. 18 is a side perspective view of the flexible motor vehicle work surface of FIG. 14 in accordance with the present disclosure, wherein both of the pair of movable horizontal surfaces are in a second deployed position, the first openable lid is in an open position, and the second and the third openable lids are in a closed position.

Such configuration is obtained by preferably providing each of the pair of foldable wings 140, 142 with an outer perimeter 154 and an inner perimeter 156 defining a central opening 158. Further, the stationary base 144 of the deployable support structure 52 is preferably provided with a raised portion 160 having an outer perimeter 162 fittingly received within the inner perimeter 156 of the foldable wings 140, 142 when the foldable wings 140, 142 are in the first stored position. As a further feature of the present embodiment, the upper surface 164 of the raised portion 160 on the stationary base 144 of the deployable support structure 52 may form a first openable lid 166 and a second openable lid 168, each of the first and second openable lids 166, 168 having a closed position above a storage compartment 170 and an open position providing access to the storage compartment 170, as shown in FIGS. 16-18, which is shown storing a cellular telephone. In addition, a rear storage compartment 172 having a third openable lid 174 movable between an open and closed position is preferably disposed on a rearward portion 176 of the upper surface 62 of the deployable support structure 52. When in the closed position, the upper surface 178 of the third openable lid 174 also preferably forms a substantially continuous surface with the exposed upper surface 150 of the pair of foldable wings 140, 142 when in the first stored position and the upper surface 62 of the deployable support structure 52.

As shown in FIG. 16, the first openable lid 166 includes a lid hinge assembly 180 operably coupling the first openable lid 166 to the stationary base 144 of the deployable support structure 52, wherein the lid hinge assembly 180 is disposed parallel to the longitudinal axis of the motor vehicle and proximate a longitudinal edge 182 of the first openable lid 166. As shown in FIG. 17, the second openable lid 168 includes a lid hinge assembly 184 operably coupling the second openable lid 168 to the stationary base 144 of the deployable support structure 52, wherein the lid hinge assembly 184 is disposed perpendicular to the longitudinal axis of the motor vehicle and proximate a lateral edge 186 of the second openable lid 168. A particularly advantageous feature of this configuration is that each of the first openable and second openable lids 166, 168 is openable with either of the pair of foldable wings 140, 142 in either of the first stored position or the second deployed position, as shown.

As shown in FIGS. 14-18, each of the pair of the foldable wings 140, 142 is operably coupled with the stationary base 144 of the deployable support structure 52 via a hinge 188 disposed proximate a forward portion 190 and a side portion 192 of each of the foldable wings 140, 142. Preferably, each of the hinges 188 is disposed at an oblique angle to the longitudinal axis of the motor vehicle. Even more preferably, each of the hinges 188 is disposed at an angle of about 45° of the longitudinal axis of the motor vehicle. Utilizing such configuration, one of the pair of the foldable wings 140 may be unfolded toward the driver side seating position 16, and the other of the pair of foldable wings 142 may be unfolded toward the passenger side seating position 20 when displaced from the first stored position to the deployed second position.

Figure 19:
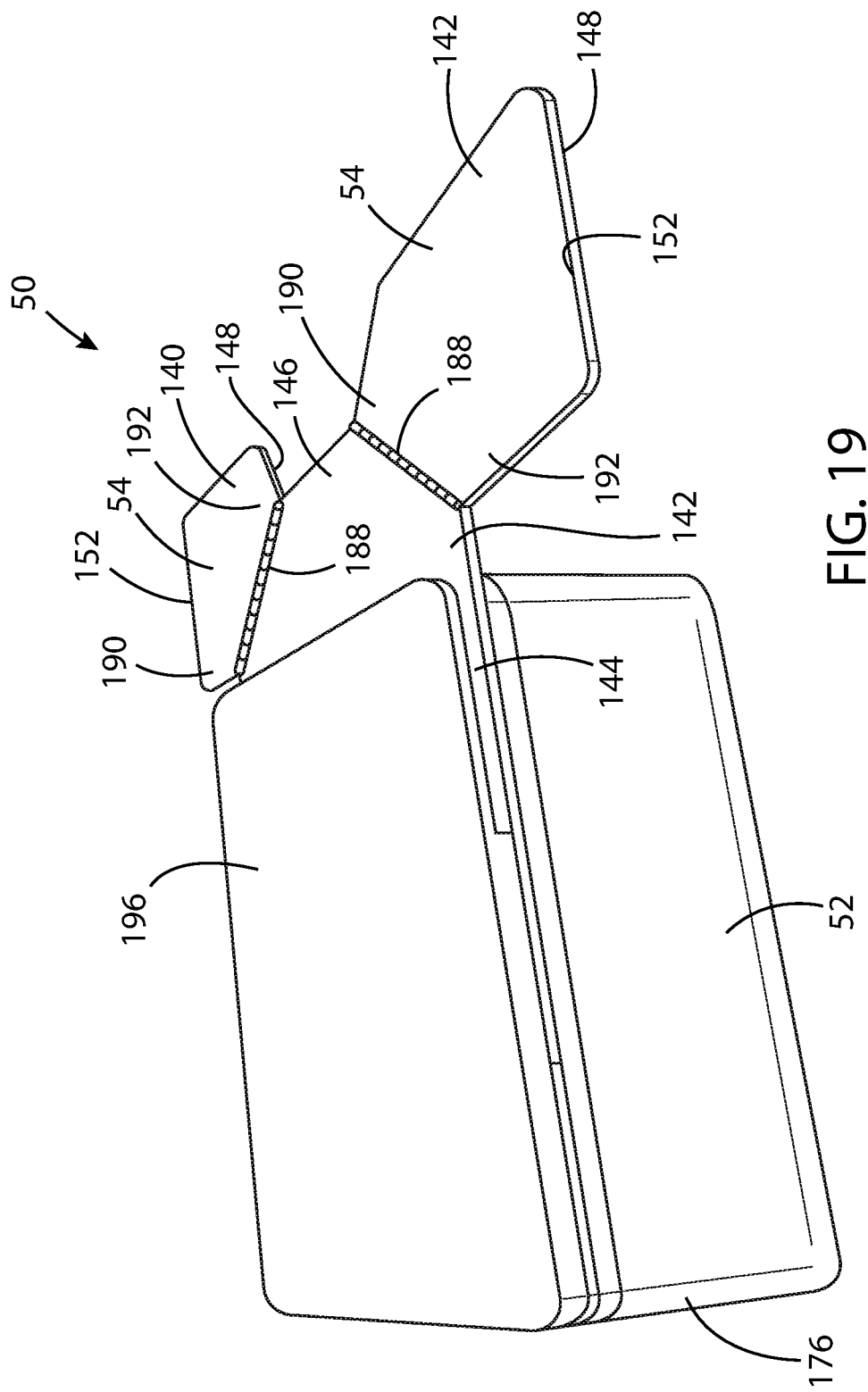
FIG. 19 is a side perspective view of another embodiment of the flexible motor vehicle work surface in accordance with the present disclosure, wherein each of the pair of movable horizontal surfaces is in a second deployed position and a storage compartment lid is in a closed position.
Figure 20:
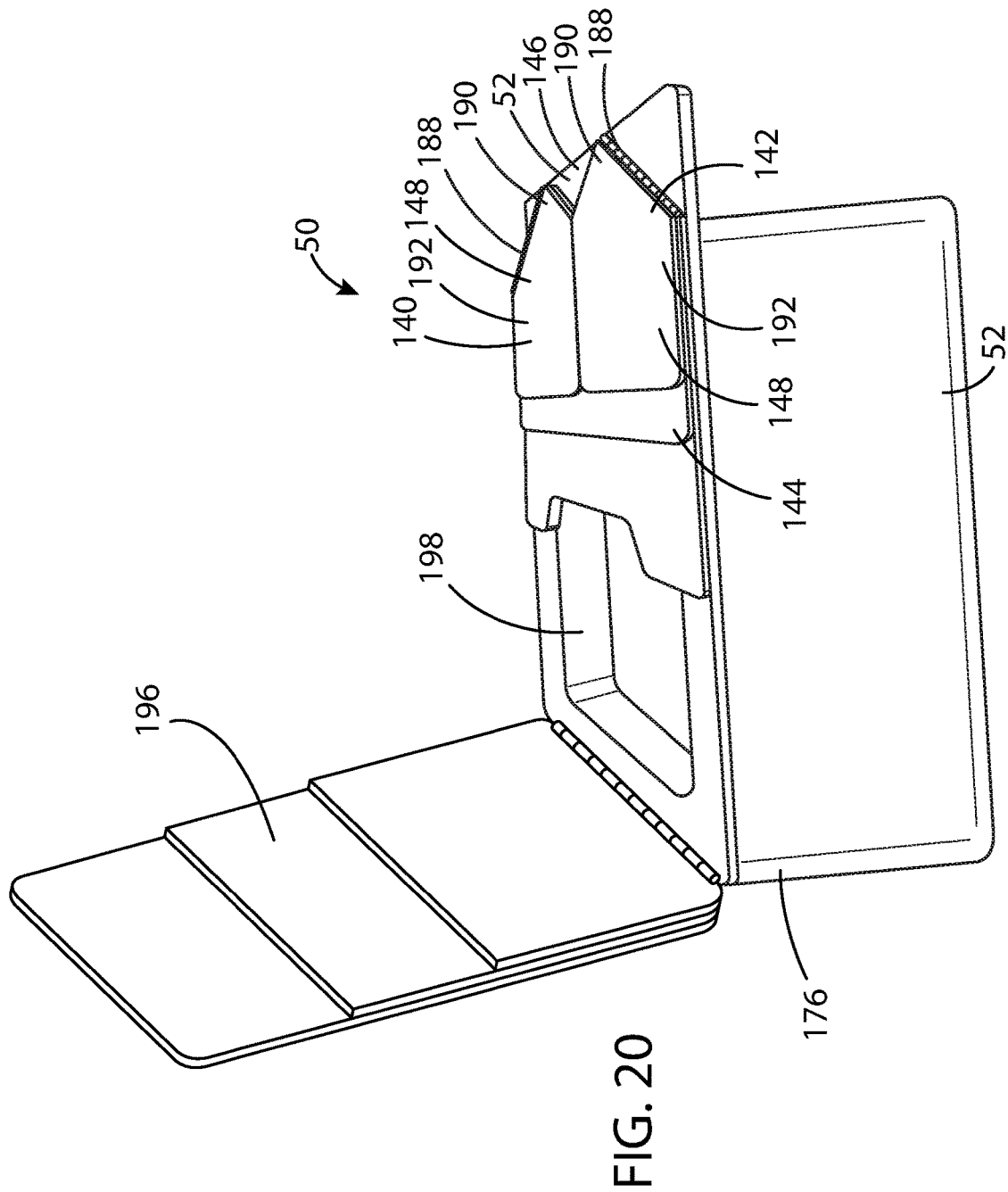
FIG. 20 is a side perspective view of the flexible motor vehicle work surface of FIG. 19 in accordance with the present disclosure, wherein each of the pair of movable horizontal surfaces is in a first stored position and the storage compartment lid is in an open position.

An additional embodiment is shown in FIGS. 19 and 20. As in the prior embodiment, each of the pair of foldable wings 140, 142 is operably coupled with the forward portion 146 of the deployable support structure 52 via hinges 188. However, in this embodiment, each of the pair of foldable wings 140, 142 comprises a substantially solid upper and lower surface 148, 152 and is coupled to an extreme forward portion of the stationary base 144 of the deployable support structure 52. When either of the pair of foldable wings 140, 142 is unfolded from the first stored position to the second deployed position, the exposed lower surface 152 of each of the pair of foldable wings 140, 142 forms the movable horizontal surface 54.

As shown in FIGS. 19 and 20, the flexible motor vehicle work surface 50 preferably may also include a closure lid 196 attached to a rearward portion 176 of the deployable support structure 52. As shown, the closure lid 196 has an open position and a closed position, wherein when the closure lid 196 is in the open position, the pair of foldable wings 140, 142 is movable between the first stored position and the second deployed position. Likewise, when the closure lid 196 is in the open position, a rear storage compartment 198 is exposed. Conversely, when the closure lid 196 is in the closed position, the movable horizontal surface 54 formed by the exposed lower surface 152 of the pair of foldable wings 140, 142 in the second deployed position and the closure lid 196 form a substantially continuous horizontal surface. As in prior embodiments, an upper surface of the closure lid 196 preferably includes a padded surface upon which an elbow of an occupant may be comfortably supported. As a further refinement, the stationary base 144 in this embodiment may be modified to allow forward and rearward sliding motion, as described above with regard to the movable base 92.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A flexible motor vehicle work surface operably coupled with a motor vehicle seating assembly comprising:
   a deployable support structure operably coupled with the motor vehicle seating assembly, the deployable support structure comprising a base disposed on an upper surface thereof; and
   a pair of foldable wings operably coupled with the deployable support structure, the pair of foldable wings having a first stored position and a deployed second position forming a movable horizontal surface;
   wherein the pair of foldable wings are each operably coupled with the base of the deployable support structure; and
   wherein each of the pair of foldable wings further comprises a hinge proximate a forward and side portion of the foldable wing at an angle oblique to the longitudinal centerline of the motor vehicle and the upper surface of the deployable support structure and the pair of foldable wings form a substantially continuous upper surface when in the deployed second position.

2. The flexible motor vehicle work surface of claim 1, wherein the foldable wing is operably coupled with the base of the deployable support structure via a hinge disposed proximate a forward portion and a side portion of the foldable wing.

3. The flexible motor vehicle work surface of claim 2, wherein the hinge is disposed at an oblique angle to a longitudinal centerline of the flexible motor vehicle work surface.

4. The flexible motor vehicle work surface of claim 3, wherein the hinge is disposed at an angle of about 45° of the longitudinal centerline of the flexible motor vehicle work surface.

5. The flexible motor vehicle work surface of claim 1, wherein the foldable wing further comprises an outer perimeter and a central opening defining an inner perimeter.

6. The flexible motor vehicle work surface of claim 5, wherein the base of the deployable support structure comprises a raised portion having an outer perimeter fittingly received within the inner diameter of the foldable wing when the foldable wing is in the first stored position.

7. The flexible motor vehicle work surface of claim 6, wherein the upper surface of the raised portion on the base of the deployable support structure forms an openable lid having a closed position above a storage compartment and an open position providing access to the storage compartment.

8. The flexible motor vehicle work surface of claim 7, wherein the lid is openable with the foldable wing in any of the first stored position and the second deployed position.

9. The flexible motor vehicle work surface of claim 7, further comprising a lid hinge assembly operably coupling the lid to the base of the deployable support structure, wherein the lid hinge assembly is disposed parallel to the longitudinal axis of the motor vehicle and proximate a longitudinal edge of the lid.

10. The flexible motor vehicle work surface of claim 7, further comprising a lid hinge assembly operably coupling the lid to the base of the deployable support structure, wherein the lid hinge assembly is disposed perpendicular to the longitudinal axis of the motor vehicle and proximate a lateral edge of the lid.

11. The flexible motor vehicle work surface of claim 1, wherein the motor vehicle seating assembly further comprises a driver side seating position and a passenger side seating position, and the foldable wing unfolds toward one of the driver side seating position or passenger side seating position when displaced from the first stored position to the deployed second position.

12. The flexible motor vehicle work surface of claim 1, wherein the motor vehicle seating assembly further comprises a driver side seating position and a passenger side seating position, and wherein a one of the pair of the movable horizontal surfaces unfolds toward the driver side seating position when displaced from the first stored position to the deployed second position and the other of the pair of the movable horizontal surfaces unfolds toward the passenger side seating position when displaced from the first stored position to the deployed second position.

13. A flexible motor vehicle work surface operably coupled with a motor vehicle seating assembly further comprises a driver side seating position, a passenger side seating position, and a center seating position disposed between the driver side seating position and the passenger side seating position, the center seating position comprising a substantially horizontal lower seat and a substantially vertical seatback assembly, the flexible motor vehicle work surface comprising:
  a deployable support structure operably coupled with the motor vehicle seating assembly, the deployable support structure comprising a base disposed on an upper surface thereof, the deployable support structure further having a first substantially vertical orientation defining the substantially vertical seatback assembly for the center seating position and a second substantially horizontal orientation defining a substantially horizontal structure upon which the movable horizontal surface is supported; and
  a pair of foldable wings operably coupled with the deployable support structure, the pair of foldable wings having a first stored position and a deployed second position forming a movable horizontal surface;
  wherein the pair of foldable wings are each operably coupled with the base of the deployable support structure;
  wherein each of the pair of foldable wings further comprises a hinge proximate a forward and side portion of the foldable wing at an angle oblique to the longitudinal centerline of the motor vehicle; and
  wherein the upper surface of the deployable support structure and the pair of foldable wings form a substantially continuous upper surface when in the deployed second position.

14. The flexible motor vehicle work surface of claim 13, wherein the center seating position comprises about 20% of the overall motor vehicle seating assembly.

15. The flexible motor vehicle work surface of claim 13, wherein the center seating position includes seat-integrated occupant protection restraints.

16. The flexible motor vehicle work surface of claim 13, wherein the substantially horizontal lower seat of the motor vehicle seating assembly further comprises a forward hinge assembly about which the substantially horizontal lower seat may be pivoted between a closed orientation and an open orientation and a storage compartment is disposed below the substantially horizontal lower seat when the substantially horizontal lower seat is in the closed orientation.

17. A flexible motor vehicle work surface operably coupled with a motor vehicle seating assembly further comprises a center seating position disposed between a driver side seating position and a passenger side seating position, the center seating position comprising a substantially horizontal lower seat and a substantially vertical seatback assembly, the flexible motor vehicle work surface comprising:
  a deployable support structure operably coupled with the motor vehicle seating assembly, the deployable support structure comprising a base disposed on an upper surface thereof, a forward portion and a rearward portion, the deployable support structure further having a first substantially vertical orientation defining the substantially vertical seatback assembly for the center seating position, and a second substantially horizontal orientation defining a substantially horizontal structure upon which the movable horizontal surface is supported; and
  a foldable wing operably coupled with the forward portion of the deployable support structure, the foldable wing having a first stored position and a deployed second position forming a movable horizontal surface;
  wherein the rearward portion of the deployable support structure comprises a storage compartment having a lid having an open position and a closed position, wherein the movable horizontal surface and the lid form a substantially continuous horizontal surface when the lid is in the closed position.

* * * * *